(12) United States Patent
Miura

(10) Patent No.: US 6,489,967 B1
(45) Date of Patent: Dec. 3, 2002

(54) IMAGE FORMATION APPARATUS AND IMAGE FORMATION METHOD

(75) Inventor: Katsuhiro Miura, Tokyo (JP)

(73) Assignee: Namco Limited, Tokyo (JP)

( * ) Notice: Subject to any disclaimer, the term of this patent is extended or adjusted under 35 U.S.C. 154(b) by 0 days.

(21) Appl. No.: 09/387,963

(22) Filed: Sep. 1, 1999

(30) Foreign Application Priority Data

Sep. 2, 1998 (JP) ............................................ 10-248281

(51) Int. Cl.[7] .............................................. G06T 11/60
(52) U.S. Cl. ........................ 345/630; 345/629; 345/634
(58) Field of Search ................................ 345/435, 629, 345/630

(56) References Cited

U.S. PATENT DOCUMENTS

| | | | | |
|---|---|---|---|---|
| 5,630,037 A | * | 5/1997 | Schindler | 345/431 |
| 5,764,229 A | * | 6/1998 | Bennett | 345/345 |
| 5,914,725 A | * | 6/1999 | MacInnis et al. | 345/441 |
| 6,023,302 A | * | 2/2000 | MacInnis et al. | 348/597 |
| 6,118,427 A | * | 9/2000 | Buxton et al. | 345/113 |
| 6,222,538 B1 | * | 4/2001 | Anderson | 345/336 |

FOREIGN PATENT DOCUMENTS

| | | | |
|---|---|---|---|
| JP | 08185543 A | 7/1996 | G06T/15/50 |
| JP | 10-187951 | 7/1998 | G06T/1/00 |

* cited by examiner

*Primary Examiner*—Matthew Luu
*Assistant Examiner*—Motilewa Good-Johnson
(74) *Attorney, Agent, or Firm*—Fitch, Even, Tabin & Flannery

(57) ABSTRACT

When displaying a scene on a display screen in which a translucent object and a background object of the translucent object overlap in a virtual space, data of a background object stored in a storage device is continuously read, a translucent calculation is performed between data of the background object and data of the translucent object overlapping the background object, and data of the result of the translucent calculation is continuously written into the storage device. Here, read of the background object data and the translucent calculation, or the translucent calculation and write of data of the translucent calculation result can be simultaneously performed. Further, the translucent calculation can be divided into a plurality of calculations, and the plurality of calculations can be performed simultaneously. With this method, translucent calculation can be performed in a short time.

6 Claims, 10 Drawing Sheets

IMAGE FORMATION APPARATUS AND IMAGE FORMATION METHOD

This application is based on Patent Application No. 10-248281 filed on Sep. 2, 1998 in Japan, the content of which is incorporated hereinto by reference.

BACKGROUND OF THE INVENTION

1. Field of the Invention

The present invention relates to an image formation apparatus and an image formation method, more specifically to an image formation apparatus and an image formation method for performing a translucent calculation in a short time when displaying a scene on a display screen in which a translucent object and a background object of the translucent object overlap in a virtual space.

2. Description of the Related Art

Recently, with the progress of image depiction technology in three-dimensional computer graphics, a variety of techniques are developed for depicting objects in a virtual space such as used in a three-dimensional game apparatus and the like. In this kind of technology, since formation of a translucent object is useful, there is known a translucent depiction technology as described, for example, in Japanese Patent Application Laying-open Nos. 10-187951(1998) (corresponding to U.S. patent application Ser. No. 09/142,658) and 8-185543(1996). The disclosure of U.S. patent application Ser. No. 09/142,658 is incorporated herein by reference. In the following, translucent depiction and a prior art translucent depiction technology will be described.

FIG. 1 is a diagram for explaining translucent depiction in a virtual space.

In the virtual space of FIG. 1, three objects exist which are represented as a polygon A600, a polygon B610 and a translucent polygon T620, respectively. Here, the object represented by the polygon T620 is a translucent object. The polygon A600 and the polygon B610 are present in a background of the translucent polygon T620. The scene in the virtual space is depicted on a two-dimensional screen 650. A pattern corresponding to the polygon A600 is a polygon A660 in the two dimensional pattern. A pattern corresponding to the polygon B610 is a polygon B670 in the two-dimensional pattern, and a pattern corresponding to the translucent polygon T620 is a translucent polygon T680 of the two-dimensional pattern. Since the translucent polygon T620 is translucent, when viewed from the screen 650 side, the polygon A600 and the polygon B610 present in the background can be seen through. Therefore, on the screen 650, the two-dimensional polygon A660 and the two-dimensional polygon B670 present in the background of the two-dimensional translucent polygon T680 are required to be depicted to be seen through. As described above, depiction of a polygon present in the background of a translucent polygon or the like or another object in a virtual space to be seen through is referred to as translucent depiction.

FIG. 2 is a diagram showing an example of a frame buffer (memory) 130 storing a depiction data depicted on the screen 650 of FIG. 1.

In FIG. 2, the depiction data corresponding to the two-dimensional polygon A660 is data 760 of the polygon A660, the depiction data corresponding to the two-dimensional polygon B670 is data 770 of the polygon B670, and the depiction data corresponding to the two-dimensional translucent polygon T680 is data 780 of the translucent polygon T680. The respective depiction data are stored in a unit of pixel 700, 710 or the like. In the data 780 of the translucent polygon T, there are a background polygon A reference part 720 which is necessary to be referred to for performing translucent depiction and a background polygon B reference part 730 which overlaps with the data of the polygon B670 present in the background and is necessary to be referred to for performing translucent depiction. For these overlapping parts, after pixel data in the data 760 of the polygon A660 is read, and calculation for translucent depiction is performed between the pixel data and a corresponding pixel data in the data 780 of the translucent polygon T680, and then it is necessary to write depiction data of the calculation result at the position of the above-described pixel. This is the same as for the data 770 of the polygon B670 and a background B reference part 730.

FIG. 3 is a diagram showing a construction example of a prior art image formation apparatus for performing translucent depiction.

In FIG. 3, as described in the following, a depiction part 100 shown by the dotted line for performing depiction processing has the frame buffer 130, a translucent calculation part 105, a controller 125, a pre-depiction processing part 101, a texture memory 120 and the like. The frame buffer 130 is a data holding circuit (storage device) for storing the depiction data, and is composed, for example, of a DRAM. The controller 125 performs switching or the like between read from the frame buffer 130 and write to the frame buffer 130. The depiction part 100 reads a depiction data (hereinafter referred to as "background data") 108 of background object necessary for translucent calculation from the frame buffer 130 through the controller 125 and outputs it to the translucent calculation part 105 for performing translucent calculation. The translucent calculation includes various color calculations necessary for translucent depiction. The pre-depiction processing part 101 inputs polygon data 102 of translucent object from the CPU part 140, and then performs pre-depiction processing including texture mapping, and outputs a pixel data 104 resulting from pre-depiction processing to the translucent calculation part 105. The translucent calculation part 105 executes translucent calculation on inputted background data 108 and pixel data 104, and writes the resulting depiction data 106 in the frame buffer 130 for each pixel through the controller 125. The CPU part 140 inputs as necessary an instruction of an operator (not shown) from an operation part 150, and outputs as necessary a sound data to a sound output part 160. The texture memory 120 connecting to the pre-depiction processing part 101 is a data holding circuit holding circuit storing data of the result of performing texture mapping on polygons and the like. Data of the frame buffer 130 is outputted to a picture output part 170 through the controller 125, and finally displayed on a screen of a display apparatus such as a CRT 180.

FIG. 4 shows an example of time chart schematically showing read of background data 108 in the translucent calculation part 105 of FIG. 3 from the frame buffer 130, translucent calculation, and write of depiction data 106 after calculation into the frame buffer 130.

As shown in FIG. 4, in the translucent calculation part 105 of the prior art image formation apparatus, read of background data Dn (R(Dn)) was performed, then translucent calculation (F(Dn)) was performed, and finally write of depiction data Dn* (W(Dn*)) was performed. That is, any of read of background data from the frame buffer 130, and write of depiction data to the frame buffer 130 is not performed continuously, but performed pixel by pixel. Therefore, an overhead due to switching occurs between read of background data and write of depiction data at each pixel. Read from the frame buffer 130 and write to the frame buffer 130 is high in efficiency when it is performed continuously, however, is low in efficiency when it is performed for each pixel. That is, a total processing time when performing for each pixel is longer than a total processing time when performing continuously. Therefore, the prior art image formation apparatus in which read from the frame buffer 130 and write to the frame buffer 130 are performed for each pixel required a longer processing time.

Further, a total $T=T_R+T_F+T_W$ of a time $T_R$ required for read of background data, a time $T_F$ required for translucent calculation, and a time $T_W$ required for write of depiction data for each pixel is required and it is repeated for each pixel. That is, in the prior art image formation apparatus, background data is read pixel by pixel from the frame buffer 130, translucent calculation is performed to the background data and pixel data of translucent object, and the calculation result is written pixel by pixel into the frame buffer 130. For this reason, at every time when depiction of translucent object is necessary, a cycle time T for read of background data, translucent calculation and write of depiction data is required, and a longer processing time is required. Further, when complicated calculations, for example, a plurality of interpolation calculations for blend and filter and the like are necessary for translucent calculation, the time $T_F$ required for translucent calculation becomes longer, which has a problem of requiring even longer processing time. Therefore, translucent calculation has been limited to a simple calculation not requiring a long processing time.

SUMMARY OF THE INVENTION

It is therefore an object of the present invention to provide an image formation apparatus and an image formation method for performing translucent calculation in a short time when displaying a scene on a display screen in which a translucent object and a background object of the translucent object overlap in a virtual space.

In a first aspect of the present invention, there is provided an image formation apparatus for displaying a scene on a display screen in which a translucent object and a background object of the translucent object overlap in a virtual space, comprising storage means for storing data of the background object, and translucent calculation means for continuously reading data of the background object stored in the storage means, performing translucent calculation between data of the background object and data of the translucent object overlapping the background object, and continuously writing data of the result of the translucent calculation to the storage means.

Here, the translucent calculation means can simultaneously perform read of the background object data and the translucent calculation, or the translucent calculation and write of data of the translucent calculation result.

The translucent calculation can be divided into a plurality of calculations, and the translucent calculation means can simultaneously perform the plurality of calculations.

In a second aspect of the present invention, there is provided an image formation method according to the present invention is an image formation method for displaying a scene on a display screen in which a translucent object and a background object of the translucent object overlap in a virtual space, comprising a storage step for storing data of the background object in storage means, a translucent calculation step for continuously reading data of the background object stored in the storage means, performing translucent calculation between data of the background object and data of the translucent object overlapping the background object, and continuously writing data of the result of the translucent calculation to the storage means.

Here, the translucent calculation step can simultaneously perform read of the background object data and the translucent calculation, or the translucent calculation and write of data of the translucent calculation result.

The translucent calculation can be divided into a plurality of calculations, and the translucent calculation step can simultaneously perform the plurality of calculations.

With the above construction, translucent calculation can be performed in a short time, when displaying a scene on a display screen in which a translucent object and a background object of the translucent object overlap in a virtual space.

The above and other objects, effects, features and advantages of the present invention will become more apparent from the following description of embodiments thereof taken in conjunction with the accompanying drawings.

DESCRIPTION OF PREFERRED EMBODIMENTS

In the following, embodiments of the present invention will be described in detail with reference to the drawings.

(First Embodiment)

Figure 1:
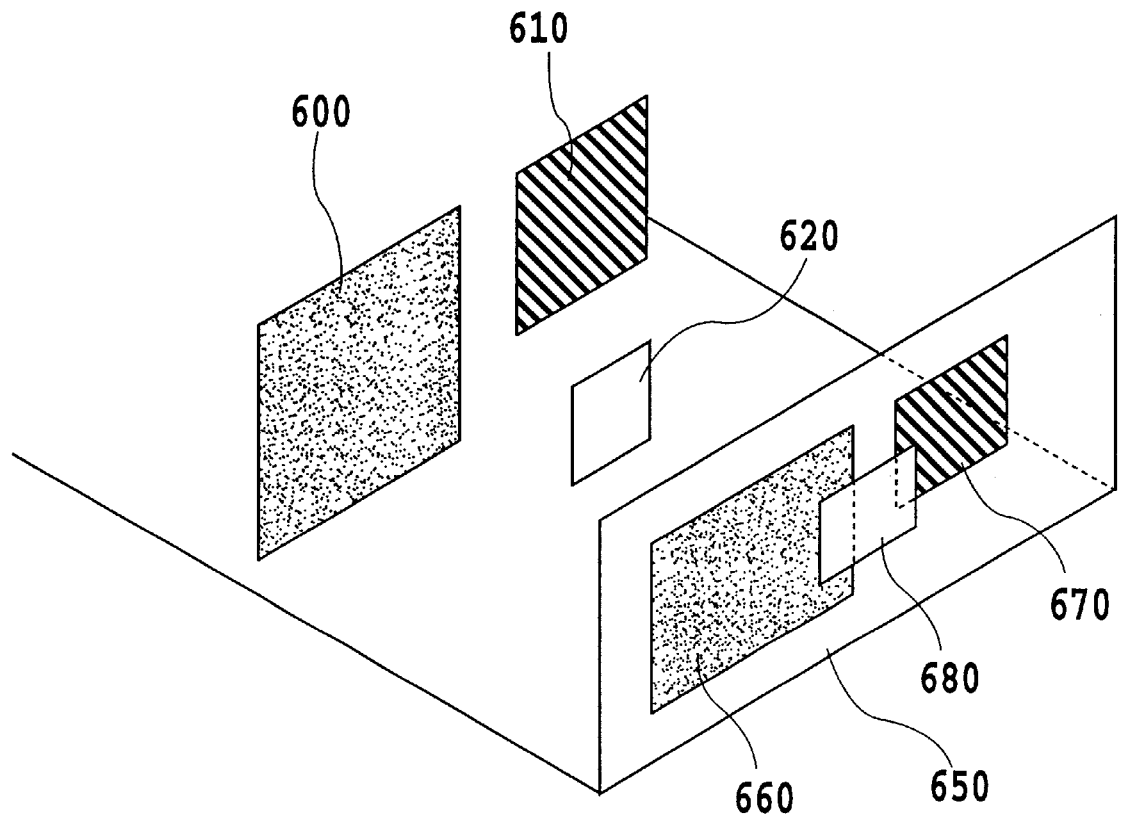
FIG. 1 is a diagram for explaining translucent depiction in a virtual space.
Figure 2:
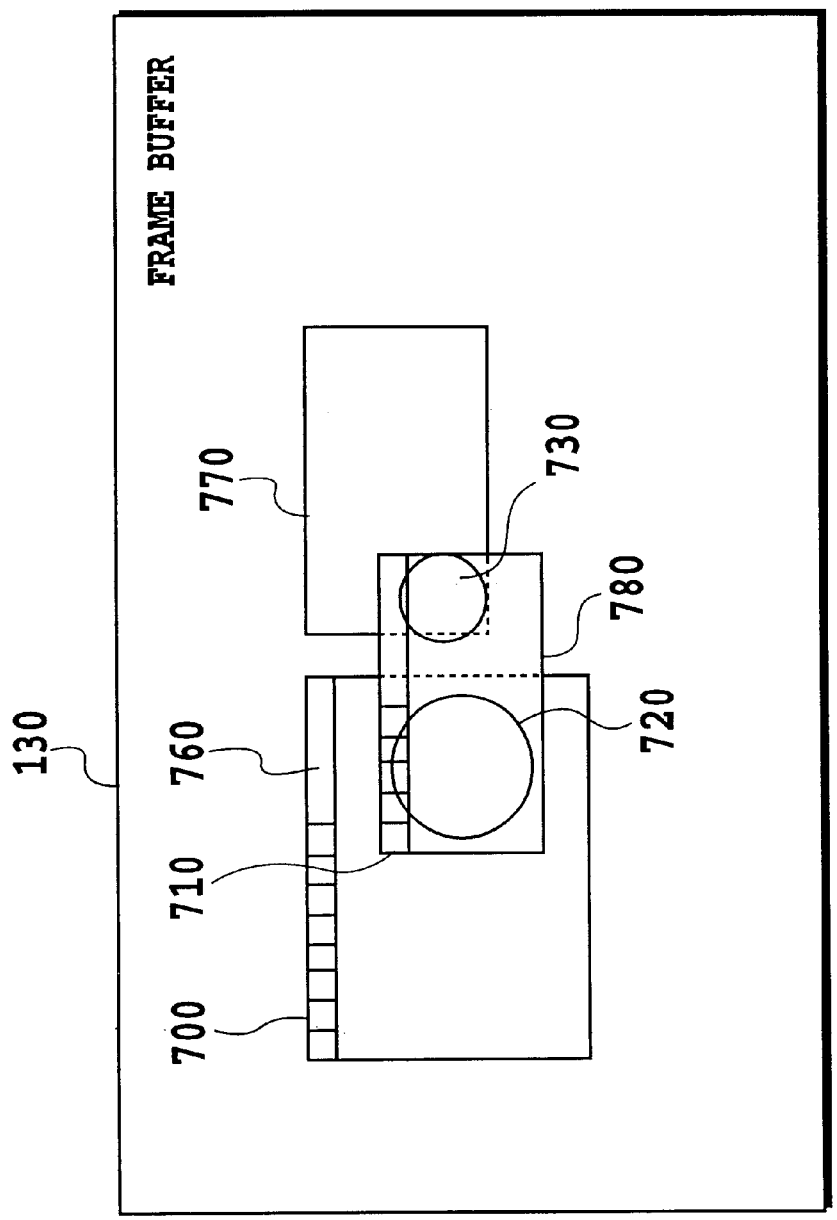
FIG. 2 is a diagram showing an example of a frame buffer (memory) 130 storing depiction data depicted on a screen 650 of FIG. 1.
Figure 3:
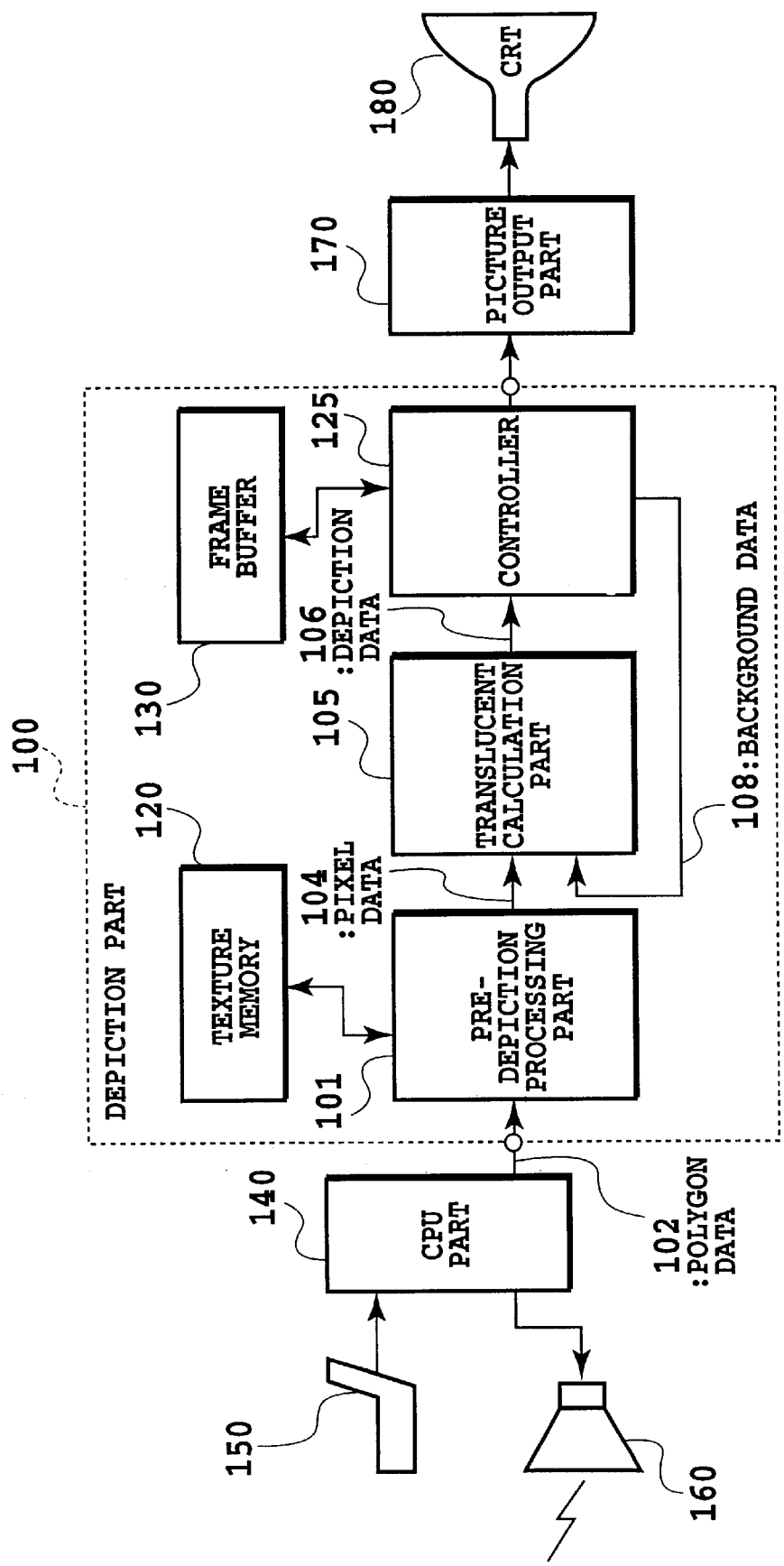
FIG. 3 is a diagram showing a construction example of a prior art image formation apparatus for performing translucent depiction.
Figure 4:
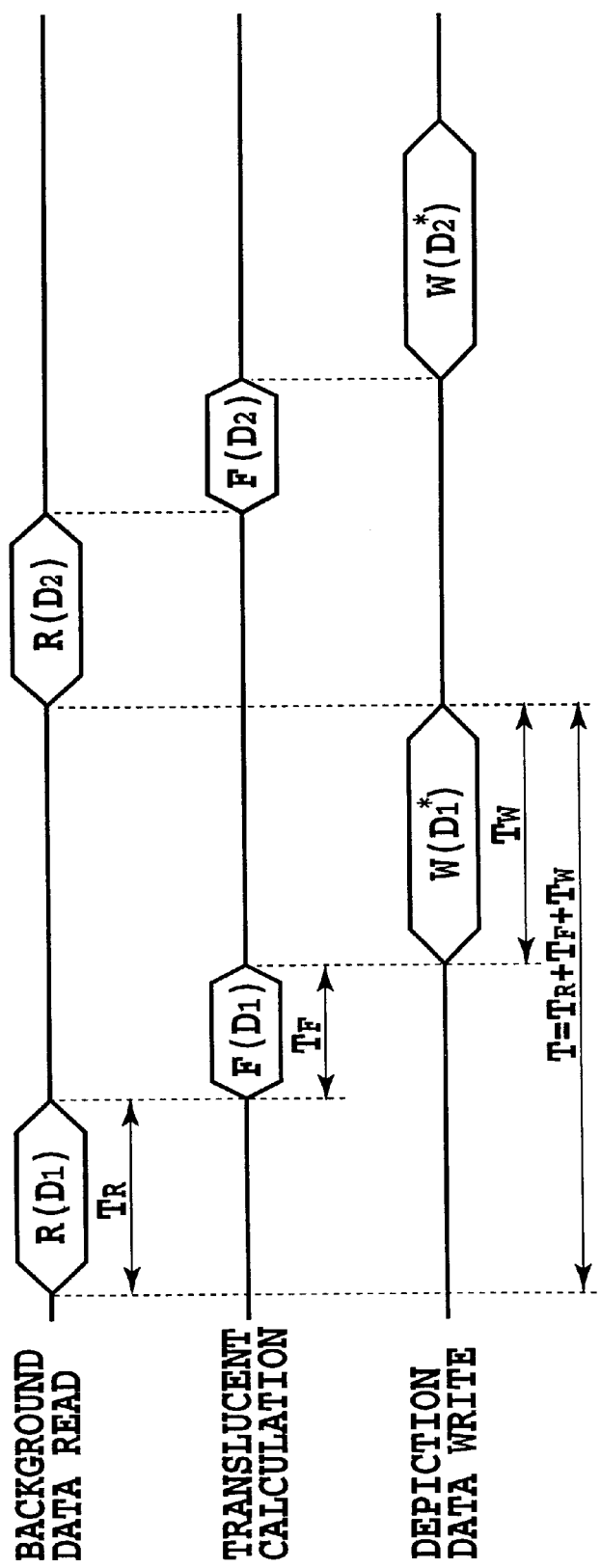
FIG. 4 is an example of time chart schematically showing read of background data 108 in a translucent calculation part 105 of FIG. 3 from the frame buffer 130, translucent calculation, and write of depiction data 106 after calculation into the frame buffer 130.
Figure 5:
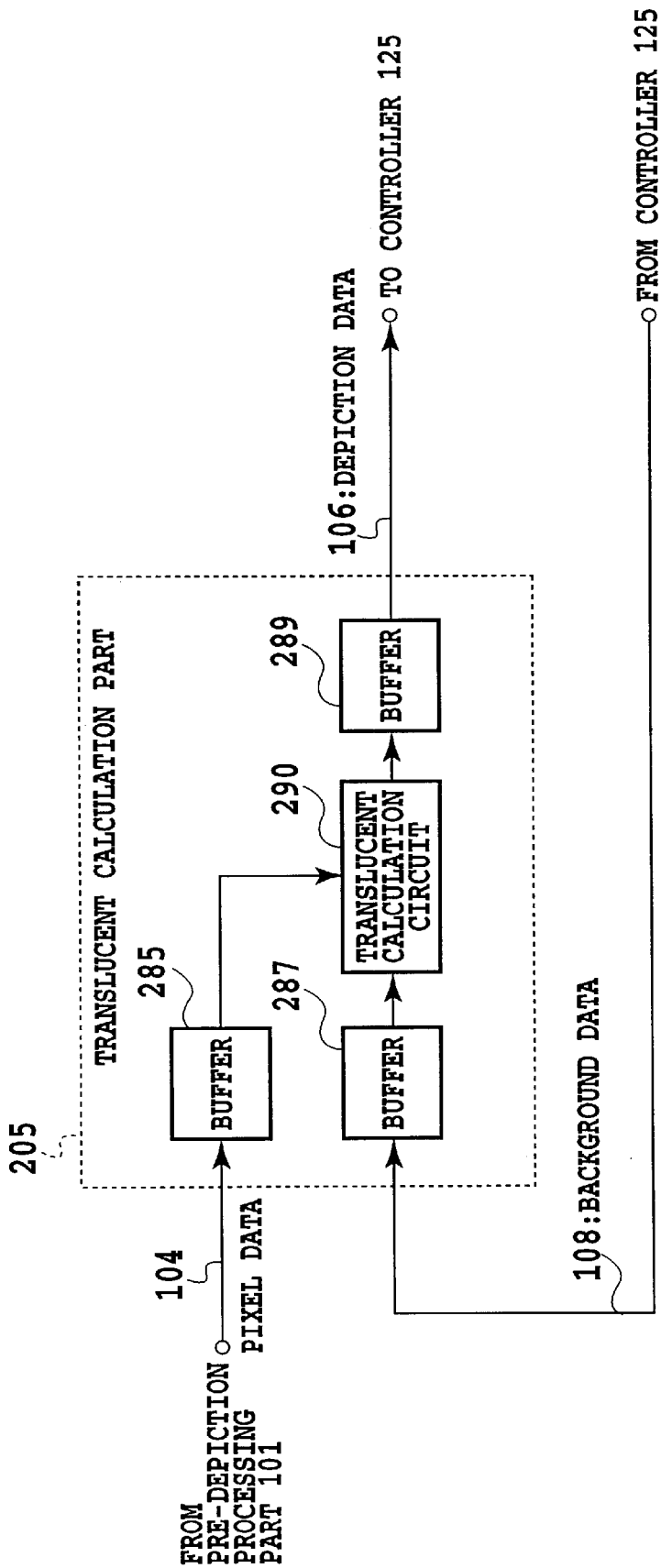
FIG. 5 is a diagram showing a construction example of a translucent calculation part 205 of the image formation apparatus according to a first embodiment of the present invention.

FIG. 5 is a diagram showing a construction example of a translucent calculation part 205 of the image formation apparatus according to a first embodiment of the present invention. The translucent calculation part 205 according to the present embodiment is shown corresponding to a prior art translucent calculation part 105. The translucent calculation part 205 according to the present embodiment continuously performs read of background data 108 from a storage device and write of depiction data 106 to the storage device.

A translucent calculation circuit 290 executes translucent calculation on the background data 108 and a pixel data 104 to generate a depiction data 106. A buffer 285 is a data holding circuit for storing the pixel data, a buffer 287 is a data holding circuit for storing the background data, and a buffer 289 is a data holding circuit for storing the depiction data obtained by translucent calculation.

Figure 6:
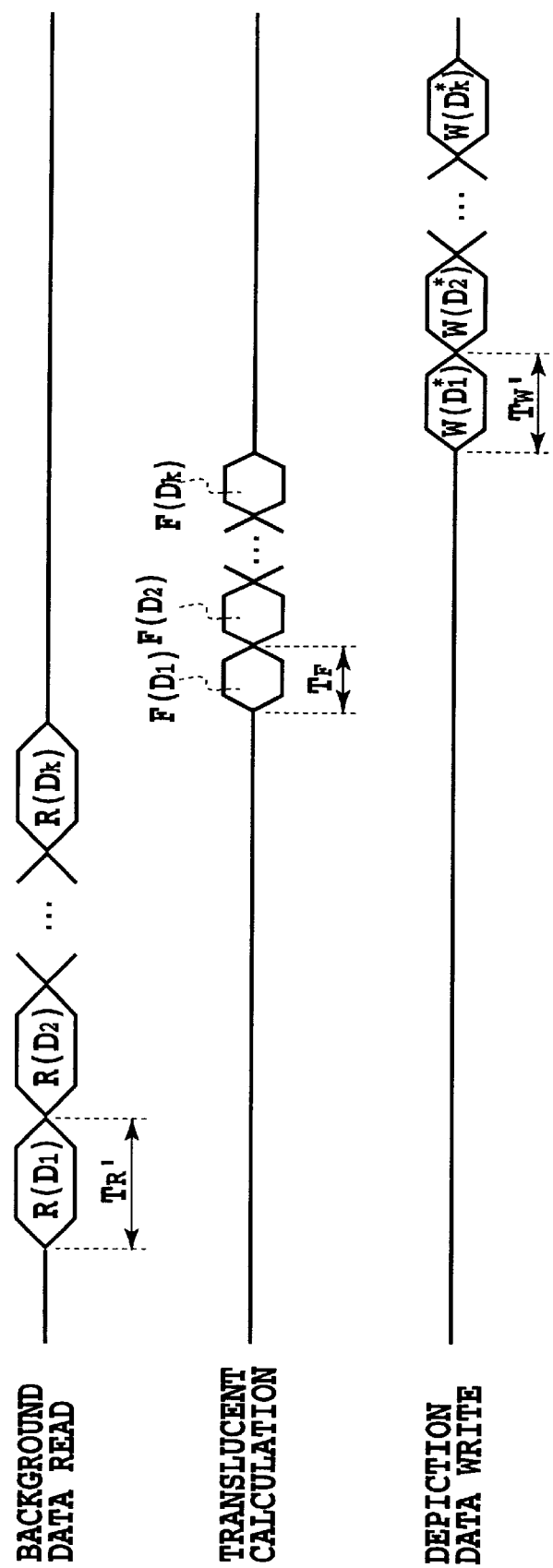
FIG. 6 is an example of time chart schematically showing read of background data 108 in a translucent calculation part 205 of FIG. 5 from the frame buffer 130, translucent calculation, and write of depiction data 106 after calculation into the frame buffer 130.

FIG. 6 is an example of time chart schematically showing read of background data 108 in the translucent calculation part 205 of FIG. 5 from the frame buffer 130, translucent calculation, and write of depiction data 106 after calculation into the frame buffer 130.

As shown in FIG. 6, in the translucent calculation part 205 according to the present embodiment, read of the background data 108 (D1 to Dk) from the frame buffer 130 to the buffer 287 is continuously (collectively) performed (R(D1) to R(Dk)). Further, pixel data of the translucent object corresponding to each pixel of the background data is continuously read from a pre-depiction processing part 101 to the buffer 285. Next, translucent calculation is continuously performed between the background data 108 in the buffer 287 and pixel data of translucent object in the buffer 285 to write into the buffer 289 (F(D1) to F(Dk)). The depiction data 106 (D1* to Dk*) obtained by translucent calculation is continuously written from the buffer 289 to the frame buffer 130 (W(D1*) to W(Dk*)).

By continuously performing read of background data and write of depiction data as shown above, read time of background data per pixel is reduced from $T_R$ to $T_R'$ and write time of depiction data per pixel from Tw to Tw'. Therefore, the total processing time is reduced.

(Second Embodiment)

Figure 7:
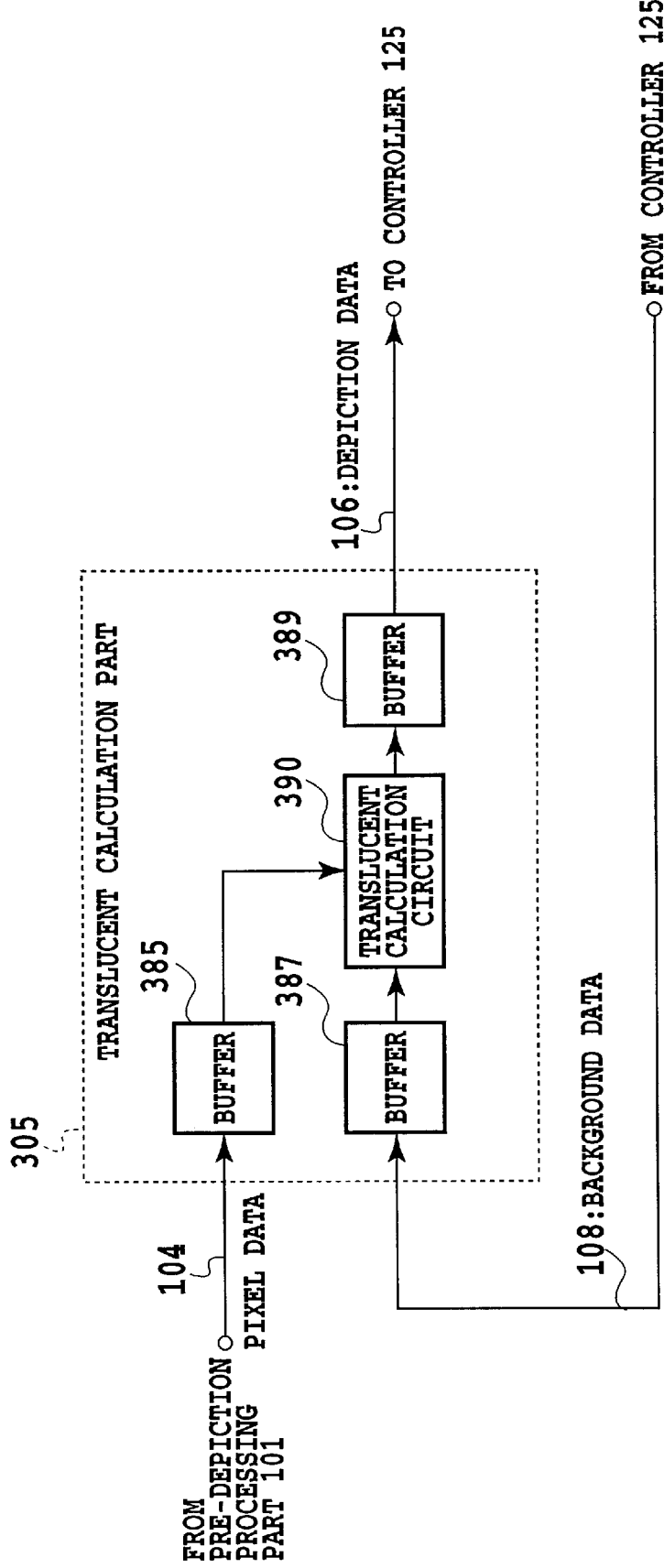
FIG. 7 is a diagram showing a construction example of a translucent calculation part 305 of the image formation apparatus according to a second embodiment of the present invention.

FIG. 7 is a diagram showing a construction example of a translucent calculation part 305 of the image formation apparatus according to a second embodiment of the present invention. The translucent calculation part 305 according to the present embodiment is shown corresponding to the prior art translucent calculation part 105. The translucent calculation part 305 according to the present embodiment simultaneously performs read of background data 108 and translucent calculation, or translucent calculation and write of depiction data 106.

A translucent calculation circuit 390 executes translucent calculation on the background data 108 and a pixel data 104 to generate a depiction data 106. A buffer 385 is a data holding circuit for storing the pixel data, a buffer 387 is a data holding circuit for storing the background data, and a buffer 389 is a data holding circuit for storing the depiction data obtained by translucent calculation. The buffer 389 can be constructed from a register such as a D flip-flop or the like.

Figure 8:
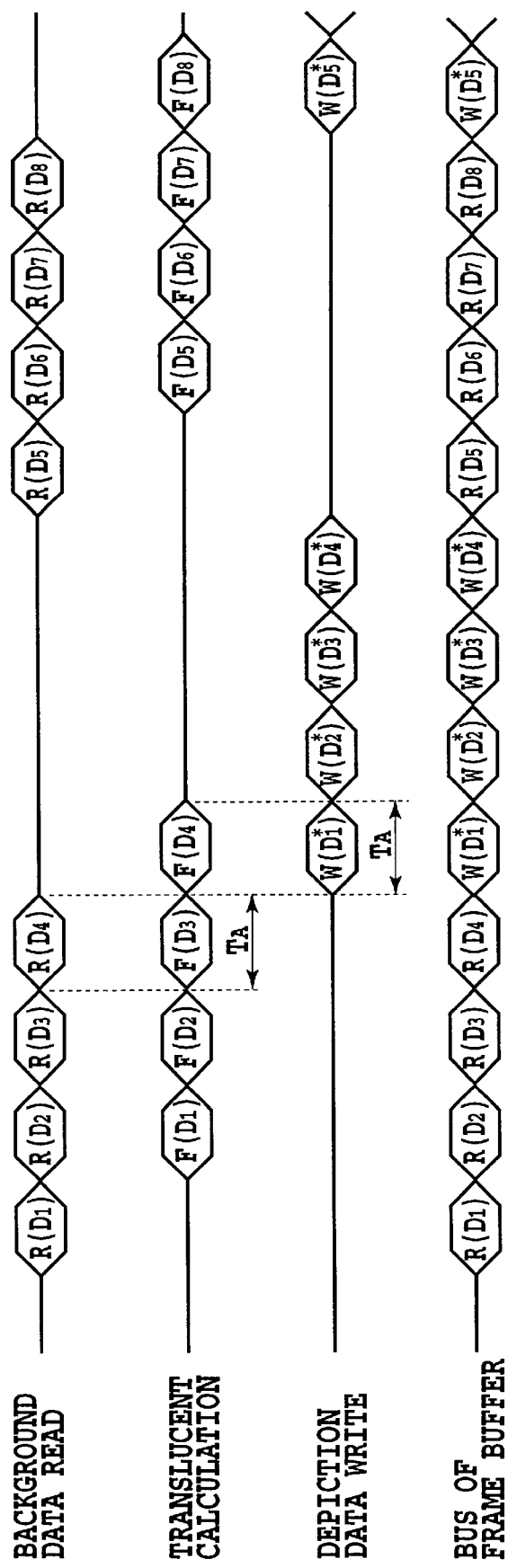
FIG. 8 is an example of time chart schematically showing read of background data 108 in a translucent calculation part 305 of FIG. 7 from the frame buffer 130, translucent calculation, and write of depiction data 106 after calculation into the frame buffer 130.

FIG. 8 is an example of time chart schematically showing read of background data 108 in the translucent calculation part 305 of FIG. 7 from the frame buffer 130, translucent calculation, and write of depiction data 106 after calculation into the frame buffer 130.

As shown in FIG. 8, in the translucent calculation part 305 according to the present embodiment, after continuously reading background data 108 of 4 pixels (Dn to $D_{n+3}$) from the frame buffer 130 to the buffer 387 (R(Dn) to R($D_{n+3}$)), and depiction data 106 of 4 pixels (Dn* to $D_{n+3}$*) are continuously written from the buffer 389 to the frame buffer 130 (W(Dn*) to W($D_{n+3}$*)), and thereafter this procedure is repeated. That is, after the bus of the frame buffer 130 is used for reading background data 108 of 4 pixels, the bus of the frame buffer 130 is used for writing depiction data 106 of 4 pixels, and thereafter this procedure is repeated. In the present embodiment, read and write are switched at every 4 pixels, however, the switching may be made at every 2 pixels, 3 pixels or 5 pixels or more.

In this case, as to translucent calculation (F(Dn) to F($D_{n+3}$)) between background data 108 in the buffer 387 (Dn to $D_{n+3}$) and pixel data of translucent object in the buffer 385, for F(Dn) to F($D_{n+2}$) it is performed simultaneously with read of background data 108, and for F($D_{n+3}$) it is performed simultaneously with write of depiction data 106. However, for example, for F(Dn) calculation may be made simultaneously with read of background data 108, and for F($D_{n+1}$) to F($D_{n+3}$) be made simultaneously with write of depiction data 106.

As described above, by simultaneously performing read of background data 108 and translucent calculation, or translucent calculation and write of depiction data 106, the total processing time is reduced as compared with the case where these processings are not performed simultaneously.

Further, in any cycle, the bus of the frame buffer 130 is used to perform read of background data 108 or write of depiction data 106 (see frame buffer bus in FIG. 8), thus utilizing the bus transfer capacity of the frame buffer 130 to a maximum.

Still further, in the translucent calculation part 305 of the image formation apparatus according to the present embodiment, read of background data 108, translucent calculation, and write of depiction data 106 are respectively performed at a cycle of time TA. The time TA is determined for 1 pixel to be not shorter than any one of time required for read of background data, time required for translucent calculation, and time required for write of depiction data after calculation.

(Third Embodiment)

Figure 9:
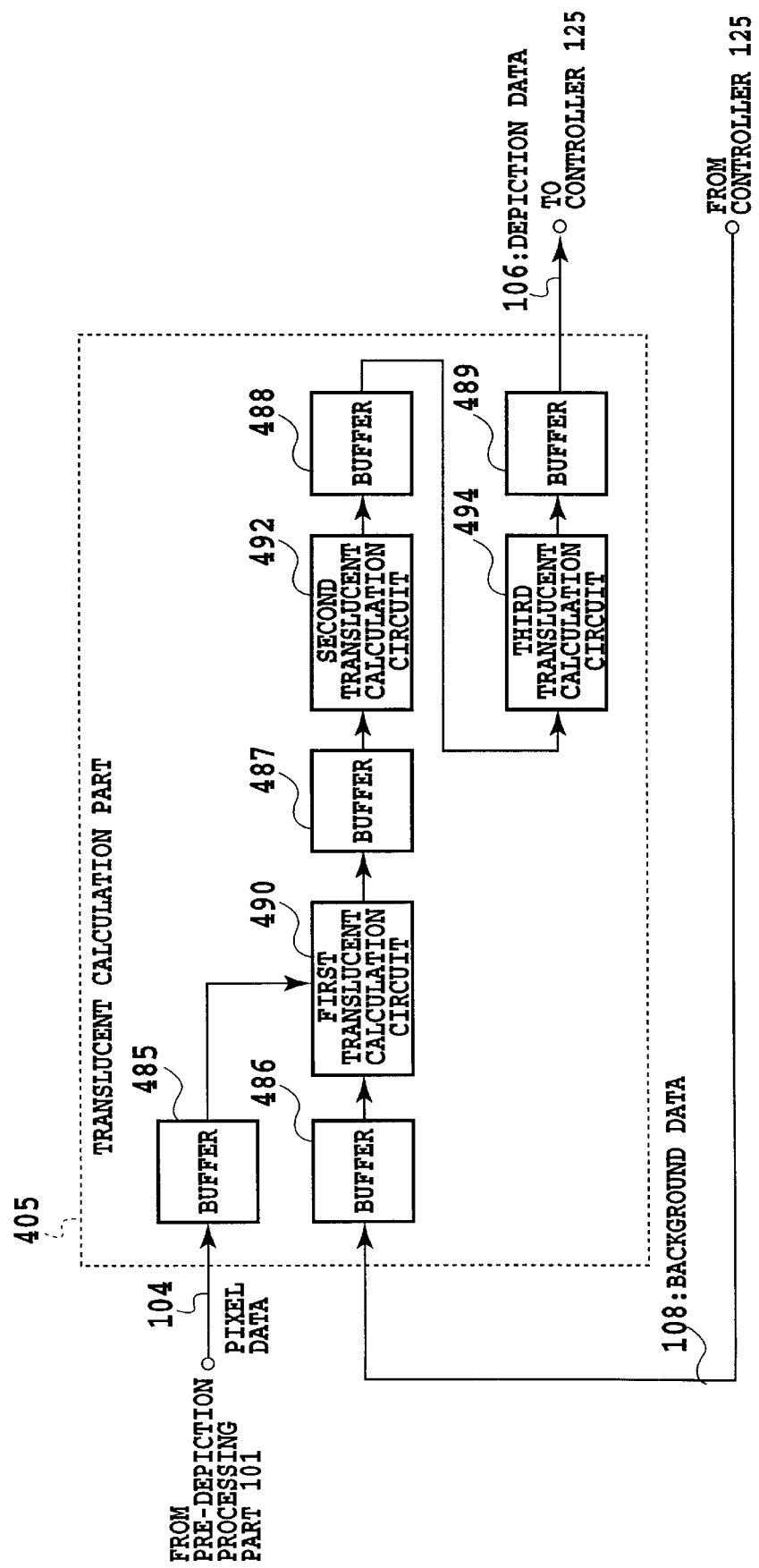
FIG. 9 is a diagram showing a construction example of a translucent calculation part 405 of the image formation apparatus according to a third embodiment of the present invention.

FIG. 9 is a diagram showing a construction example of a translucent calculation part 405 of the image formation apparatus according to a third embodiment of the present invention. The translucent calculation part 405 according to the present embodiment is shown corresponding to the prior art translucent calculation part 105. The translucent calculation part 405 according to the present embodiment divides translucent calculation into three calculations (first translucent calculation, second translucent calculation and third translucent calculation) and simultaneously performs these three calculations. In the present embodiment, translucent calculation is divided into three calculations, however, it is not limited to three, but may be divided into two or four or more calculations.

A first translucent calculation circuit 490 executes the first translucent calculation for background data 108 and pixel data 104, and transfers the resulting data to a second translucent calculation circuit 492 through a buffer 487. The second translucent calculation circuit 492 executes the second translucent calculation to the transferred data and transfers the resulting data to a third translucent calculation circuit 494 through a buffer 488. The third translucent calculation circuit 494 executes the third translucent calculation to the transferred data to generate depiction data 106.

A buffer 485 is a data holding circuit for storing pixel data, a buffer 486 is a data holding circuit for storing background data, the buffer is a data holding circuit for storing data obtained by the first translucent calculation, the buffer 488 is a data holding circuit for storing data obtained by the second translucent calculation, and the buffer 489 is a data holding circuit for storing depiction data obtained by translucent calculation.

Figure 10:
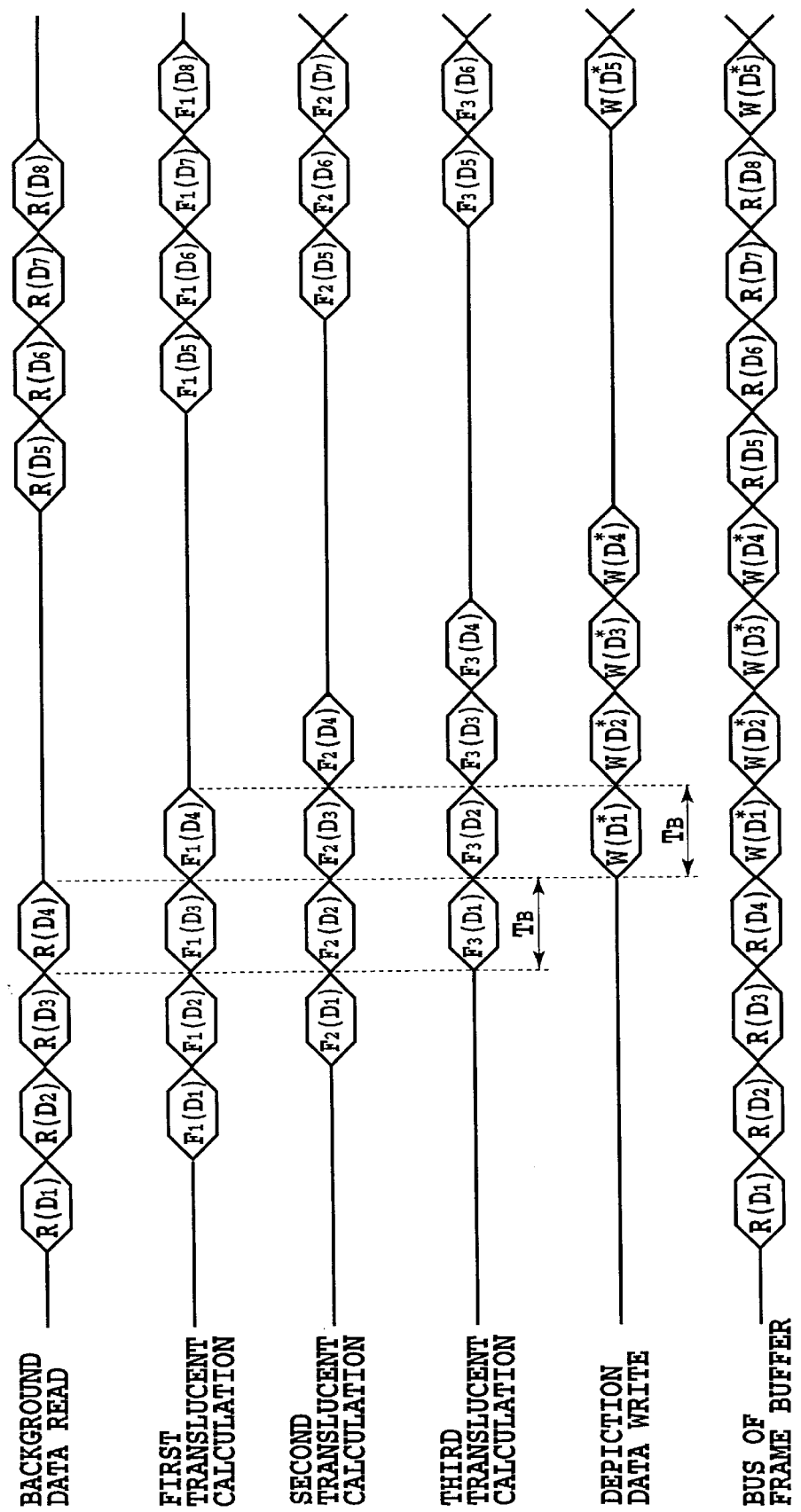
FIG. 10 is an example of time chart schematically showing read of background data 108 in a translucent calculation part 405 of FIG. 9 from the frame buffer 130, translucent calculation, and write of depiction data 106 after calculation into the frame buffer 130.

FIG. 10 is an example of time chart schematically showing read of background data 108 in the translucent calculation part 405 of FIG. 9 from the frame buffer 130, translucent calculation, and write of depiction data 106 after calculation into the frame buffer 130.

As shown in FIG. 10, in the translucent calculation part 405 of the image formation apparatus according to the present embodiment, after background data 108 of 4 pixels (Dn to $D_{n+3}$) are continuously read from the frame buffer 130 to the buffer 486 (R(Dn) to R($D_{n+3}$)), depiction data 106 of 4 pixels (Dn* to $D_{n+3}$*) are continuously written from the buffer 489 to the frame buffer 130 (W(Dn*) to W($D_{n+3}$*)), and thereafter this procedure is repeated. That is, after the bus of the frame buffer 130 is used for reading background data 108 of 4 pixels, the bus of the frame buffer 130 is used for writing depiction data 106 of 4 pixels, and thereafter this procedure is repeated. In the present embodiment, read and write are switched at every 4 pixels, however, the switching may be made at every 2 pixels, 3 pixels or 5 pixels or more.

In this case, as to translucent calculation (F1(Dn) to F1($D_{n+3}$), F2(Dn) to F2($D_{n+3}$), and F3(Dn) to F3($D_{n+3}$)) between background data 108 in the buffer 387 (Dn to $D_{n+3}$) and pixel data 104 of translucent object in the buffer 385, F1($D_{n+1}$) and F2(Dn) are simultaneously performed, F1($D_{n+3}$), F2($D_{n+2}$) and F3($D_{n+1}$) are simultaneously performed, and F2($D_{n+3}$) and F3($D_{n+3}$) are simultaneously performed. As described above, by simultaneously performing translucent calculation (first translucent calculation, second translucent calculation and third translucent calculation), the total processing time is reduced as compared with the case where these processings are not performed simultaneously.

Further, F1(Dn) to F1($D_{n+2}$), F2(Dn) and F2($D_{n+1}$) and F3(Dn) are performed simultaneously with read of background data 108, F1($D_{n+3}$), F2($D_{n+2}$) and F2($D_{n+3}$) and F3($D_{n+1}$) to F3($D_{n+3}$) are performed simultaneously with write of depiction data 106. As described above, by simultaneously performing read of background data 108 and translucent calculation, or translucent calculation and write of depiction data 106, the total processing time is reduced as compared with the case where these processings are not performed simultaneously.

Further, in any cycle, the bus of the frame buffer 130 is used to perform read of background data 108 or write of depiction data 106 (see frame buffer bus in FIG. 10), thus utilizing the bus transfer capacity of the frame buffer 130 to a maximum.

Still further, in the translucent calculation part 405 of the image formation apparatus according to the present embodiment, read of background data 108, first translucent calculation, second translucent calculation, third translucent calculation and write of depiction data 106 are respectively performed at a cycle of time $T_B$. The time $T_B$ is determined for 1 pixel to be not shorter than any one of time required for read of background data, time required for first translucent calculation, time required for second translucent calculation, time required for third translucent calculation and time required for write of depiction data after calculation. In the present embodiment, since translucent calculation is divided into three calculations, the time $T_B$ can be reduced as compared with the case where translucent calculation is not divided into three calculations, and the total processing time be reduced. When the total calculation can be divided into a plurality of calculations, it is effective for a translucent calculation of long total calculation time which requires a plurality of calculations such as blend and filter.

As described above, with the present invention, when displaying a scene on a display screen in which a translucent object and a background object of the translucent object overlap in a virtual space, translucent calculation can be performed in a short time.

The present invention has been described in detail with respect to preferred embodiments, and it will be now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image formation apparatus for displaying a scene on a display screen in which a translucent object and a background object of said translucent object overlap in a virtual space, comprising:

storage means for storing data of said background object; and translucent calculation means for reading data of said background object stored in said storage means, performing translucent calculation between data of said background object and data of said translucent object overlapping said background object, and writing data of said translucent calculation to said storage means, wherein said translucent calculation means continuously reads data of said background object for two or more pixels stored in said storage means, and/or continuously writes data of result of said translucent calculation for two or more pixels to said storage means.

2. An image formation apparatus for displaying a scene on a display screen in which a translucent object and a background object of said translucent object overlap in a virtual space, comprising:

storage means for storing data of said background object; and translucent calculation means for reading data of said background object stored in said storage means, performing translucent calculation between data of said background object and data of said translucent object overlapping said background object, and writing data of said translucent calculation to said storage means, wherein said translucent calculation means simultaneously performs read of said background object data and said translucent calculation, or said translucent calculation and write of data of said translucent calculation result.

3. An image formation apparatus for displaying a scene on a display screen in which a translucent object and a background object of said translucent object overlap in a virtual space, comprising:

storage means for storing data of said background object; and translucent calculation means for reading data of said background object stored in said storage means, performing translucent calculation between data of said background object and data of said translucent object overlapping said background object, and writing data of said translucent calculation to said storage means, wherein said translucent calculation includes a plurality of calculations, and said translucent calculation means simultaneously performs said plurality of calculations.

4. An image formation apparatus for displaying a scene on a display screen in which a translucent object and a background object of said translucent object overlap in a virtual space, comprising:

storage means for storing data of said background object; and translucent calculation means for reading data of said background object stored in said storage means, performing translucent calculation between data of said background object and data of said translucent object overlapping said background object, and writing data of said translucent calculation to said storage means, wherein said translucent calculation step continuously reads data of said background object for two or more pixels stored in said storage means, and/or continuously writes data of result of said translucent calculation for two or more pixels to said storage means.

5. An image formation apparatus for displaying a scene on a display screen in which a translucent object and a background object of said translucent object overlap in a virtual space, comprising:

storage means for storing data of said background object; and translucent calculation means for reading data of said background object stored in said storage means, performing translucent calculation between data of said background object and data of said translucent object overlapping said background object, and writing data of said translucent calculation to said storage means, wherein the translucent calculation step simultaneously performs read of said background object data and said translucent calculation, or said translucent calculation and write of data of said translucent calculation result.

6. An image formation apparatus for displaying a scene on a display screen in which a translucent object and a background object of said translucent object overlap in a virtual space, comprising:

storage means for storing data of said background object; and translucent calculation means for reading data of said background object stored in said storage means, performing translucent calculation between data of said background object and data of said translucent object overlapping said background object, and writing data of said translucent calculation to said storage means, wherein said translucent calculation includes a plurality of calculations, and said translucent calculation step simultaneously performs said plurality of calculations.

* * * * *